United States Patent
Boppart et al.

(10) Patent No.: US 12,092,576 B2
(45) Date of Patent: Sep. 17, 2024

(54) CLIPPING-ASSISTED DUAL-FLUOROPHORE SENSING

(71) Applicant: The Board of Trustees of the University of Illinois, Urbana, IL (US)

(72) Inventors: Stephen A. Boppart, Champaign, IL (US); Haohua Tu, Savoy, IL (US); Sixian You, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 178 days.

(21) Appl. No.: 17/621,922

(22) PCT Filed: May 5, 2020

(86) PCT No.: PCT/US2020/031432
§ 371 (c)(1),
(2) Date: Dec. 22, 2021

(87) PCT Pub. No.: WO2021/002929
PCT Pub. Date: Jan. 7, 2021

(65) Prior Publication Data
US 2022/0228987 A1 Jul. 21, 2022

Related U.S. Application Data

(60) Provisional application No. 62/870,417, filed on Jul. 3, 2019.

(51) Int. Cl.
*G01N 21/64* (2006.01)
(52) U.S. Cl.
CPC ............ *G01N 21/6428* (2013.01); *G01N 2201/06113* (2013.01)

(58) Field of Classification Search
CPC ..... G01N 21/6428; G01N 2201/06113; G01N 15/1434; G01N 2015/1006;
(Continued)

(56) References Cited

U.S. PATENT DOCUMENTS

| | | | |
|---|---|---|---|
| 2007/0287186 A1* | 12/2007 | Soini | G01N 33/582 436/86 |
| 2011/0261349 A1 | 10/2011 | Cheng et al. | |
| 2014/0031647 A1 | 1/2014 | Lin et al. | |

OTHER PUBLICATIONS

Pavillon et al., "Multimodal label-free microscopy," J. Innovative Optical Health Sciences, vol. 7, 1330009 (2014).
(Continued)

*Primary Examiner* — Kiho Kim
(74) *Attorney, Agent, or Firm* — Sunstein LLP

(57) ABSTRACT

A method is provided for characterizing a biological sample having a plurality of fluorophores, including a red fluorophore and a blue fluorophore, comprises exciting the red fluorophore via absorption of a photon order of n by a single wavelength band of light that has longer wavelengths than a typical wavelength band of light known to excite the red fluorophore would have. The method further comprises exciting the blue fluorophore substantially via absorption of a photon order of n+1 by the single wavelength band of light. The method also comprises simultaneously detecting light emitted by the red fluorophore and the blue fluorophore. The method further comprises creating an image or a temporal series for sensing from the light detected in the plurality of orthogonal colors.

20 Claims, 6 Drawing Sheets

(58) Field of Classification Search
CPC ..... G01N 2015/144; G01N 2015/1477; G01N 2015/1488; G01N 15/1459; G01N 15/1463; G01N 21/636; G01N 21/6486; G01N 21/6408; G01N 21/6458; G01N 2021/6421; G01N 2021/6441
See application file for complete search history.

(56) References Cited

OTHER PUBLICATIONS

Lu et al., "Integrated Coherent Anti-Stokes Raman Scattering and Multiphoton Microscopy for Biological Imaging using Spectral Filtering of a Femtosecond Laser," Appl. Phys. Lett., vol. 96, 133701 (2010).

Chu et al., "High-resolution simultaneous three-photon fluorescence and third-harmonic-generation microscopy," Microsc. Res. Tech., vol. 66, pp. 193-197 (2005).

Zomer et al., "In Vivo Imaging Reveals Extracellular Vesicle-Mediated Phenocopying of Metastatic Behavior," Cell, vol. 161, pp. 1046-1057 (2015).

Pope et al., "Simultaneous hyperspectral differential-CARS, TPF and SHG microscopy with a single 5 fs Ti:Sa laser," Opt. Exp., vol. 25, pp. 7096-7106 (2013).

Segawa et al., "Label-free tetra-modal molecular imaging of living cells with CARS, SHG, THG and TSFG (coherent anti-Stokes Raman scattering, second harmonic generation, third harmonic generation and third-order sum frequency generation)," Opt. Exp, vol. 20, pp. 9551-9557 (2012).

Genty et al., "Fiber supercontinuum sources," J. Opt. Soc. Am. B, vol. 24, pp. 1771-1785 (2007).

Boppart, "Label-Free Multimodal Multiphoton Microscopy of Carcinogenesis by Shaping Fiber Supercontinuum Pulses," presented at the Advanced Fluorescence Microscopy Workshop, ISS Fluorescence Foundation (2015).

Li et al., "In vivo and simultaneous multimodal imaging: Integrated multiplex coherent anti-Stokes Raman scattering and two-photon microscopy," Appl. Phys. Lett., vol. 97, 223702 (2010).

Chen et al., "A multimodal platform for nonlinear optical microscopy and microspectroscopy," Opt. Expr, vol. 17, pp. 1282-1290 (2009).

Tu et al., "Coherent Fibers Supercontinuum for Biophotonics," Laser Photon Rev, vol. 7 (2013).

Zipfel et al., "Live tissue intrinsic emission microscopy using multiphoton-excited native fluorescence and second harmonic generation," Proc. Natl. Acad. Sci. USA, vol. 100, pp. 7075-7080 (2003).

Chu et al., "Multimodal nonlinear spectral microscopy based on a femtosecond Cr: forstente laser," Opt. Lett., vol. 26, pp. 1909-1911 (2001).

Weigelin et al., "Intravital third harmonic generation microscopy of collective melanoma cell invasion: principles of interface guidance and microvesicle dynamics," Intravital, vol. 1, pp. 32-43 (2012).

Weissleder et al., "Shedding light onto live molecular targets," Nat. Med., vol. 9, pp. 123-128 (2003).

Vogler et al., "Multimodal imaging to study the morphochemistry of basal cell carcinoma," J. Biophotonics, vol. 3, pp. 728-736 (2010).

Liu et al., "Multimodal nonlinear mixcroscopy by shaping of a fiber supercontinuum from 900 to 1160 nm," IEEE J. Sel. Top. Quantum Electron, vol. 18, 1209-14 (2012).

Pegoraro et al., "Optimally chirped multimodal CARS microscopy based on a single Ti:sapphire oscillator," Opt. Expr, vol. 17, pp. 2984-2996 (2009).

Huland et al., "Three-photon excited fluorescence imaging of unstained tissue using a GRIN lens endoscope," Biomed. Opt. Express, vol. 4, pp. 652-658 (2013).

Tu et al., "Stain-Free Histopathology by Programmable Supercontinuum Pulses," Nat. Photonics, vol. 10, pp. 534-540 (2016).

Koenig., "Hybrid multiphoton multimodal tomography of in vivo human skin," IntraVital, vol. 1, pp. 11-26 (2012).

Washburn et al., "Fiber-laser-based frequency comb with a tunable repetition rate," Opt. Expr., vol. 12, pp. 4999-5004 (2004).

Heidt et al., "Mid-infrared ZBLAN fiber supercontinuum source using picosecond diode-pumping at 2 μm," Opt. Expr., vol. 21, pp. 24281-24287 (2013).

You, et al., "Intravital imaging by simultaneous label-free autofluorescence-multiharmonic microscopy," Nature Communications, vol. 9, No. 1, 9 pages, May 29, 2018.

Boppart, et al., "Simultaneous label-free autofluorescence-multiharmonic microscopy and beyond," APL Photonics, vol. 4, No. 10, pp. 100901-100916, Oct. 1, 2019.

European Patent Office as the International Searching Authority, Authorized Officer: Jan Brauer, International Search Report and Written Opinion of the International Searching Authority, PCT/US20/31432, Sep. 21, 2020, 15 pages.

\* cited by examiner

| | Trp-(NADH/FAD) | NADH-FAD | (NADH/FAD)-porphyrin |
|---|---|---|---|
| Targeted fluorophore pair | Trp-(NADH/FAD) | NADH-FAD | (NADH/FAD)-porphyrin |
| Blue-clipped 2PAF signal | NADH | FAD | Porphyrin |
| Full 3PAF signal | Trp | NADH | NADH/FAD |
| Excitation wavelength $\lambda$ | 800 nm | 1035 nm | 1110 nm | ~1200 nm |
| Duty-cycle $f\tau$ | | $<10^{-6}$ | |
| Commercial or custom laser source (size) | Commercial Ti:sapphire amplifier (bulky) | Commercial Yb fiber amplifier (compact) | Custom source (intermediate) | Commercial optical parametric amplifier (bulky) |
| Advantage(s) | Information of Trp-NADH Förster resonance energy, quantitative redox NADH-FAD metabolic imaging | Plausible single-shot Trp-NADH-FAD-porphyrin imaging by fiber laser source | Plausible single-shot Trp-NADH-FAD-porphyrin imaging | Quantitative ratiometric NADH-FAD-lipid/THG live-cell imaging, deep-tissue imaging |
| Limitation(s) | Impaired THG for live-tissue imaging, photodamage due to short excitation wavelength | Impaired THG and quantitative redox NADH-FAD metabolic imaging | Impaired quantitative redox NADH-FAD metabolic imaging | Weak auto-fluorescence signals in comparison to harmonics signals |

*FIG. 3*

CLIPPING-ASSISTED DUAL-FLUOROPHORE SENSING

The present application is the national phase entry under 35 U.S.C. § 371 of Patent Cooperation Treaty Application Serial No. PCT/US2020/031432, entitled "Clipping-Assisted Dual-Fluorophore Sensing" and filed May 5, 2020, which claims priority to U.S. Provisional Patent Application Ser. No. 62/870,417, entitled "Clipping-Assisted Dual-Fluorophore Sensing" and filed Jul. 3, 2019, each of which is incorporated in its entirety herein by reference.

This invention was made with government support under grants CA213149 and EB023232 awarded by the National Institutes of Health. The government has certain rights in the invention.

TECHNICAL FIELD

The present invention relates to methods for sensing of molecules, and more particularly to sensing of molecules with a single wavelength band of light using clipping-assisted dual-fluorophore sensing.

BACKGROUND ART

Over the past two decades, a variety of biological phenomena have been investigated using images based on the auto-fluorescence of endogenous molecules excited by two/three-photon processes or optical emission from specially structured molecules by second/third harmonic generation. While these studies demonstrate excellent possibilities for laser-scanning label-free live-cell/tissue imaging, each modality provides only a sub-set of the intrinsically accessible information, and promises to provide more comprehensive and informative images when augmented by complementary information from other modalities. A recent study further demonstrated the power of this approach for stain-free histopathology by integrating these four modalities, visualizing a variety of vital events in carcinogenesis including tumor cell migration, angiogenesis, and tumor-associate microvesicle enrichment. However, similar to previous studies, two major drawbacks limited the application of this technology for further preclinical and clinical studies. First, the integration of these four contrast-generating processes usually requires different excitation bands and sequential image collection, which increases acquisition time as well as photodamage risk, and prevents rigorous spatial co-registration between sequentially detected signals, especially in living systems. Second, not all endogenous fluorophores and molecular structures in untreated biological tissues generate strong signals, which directly leads to either long image acquisition time or poor image contrast.

Simultaneous (not concurrent) implementation of multiple nonlinear imaging modalities has been demonstrated over the last decade. One type of platform simultaneously collected the structural information (noncentrosymmetry) of second-harmonic generation (SHG) and the functional information of two-photon auto-fluorescence (2PAF) for nicotinamide adenine dinucleotide (NADH, including its concentration and fluorescence lifetime) and three-photon auto-fluorescence (3PAF) for serotonin excited at a short-wavelength (SW) band of 950 nm, and can thus be termed as SW-SHG&2PAF(&3PAF) imaging. Another type of platform simultaneously collected the structural information of SHG and third-harmonic generation (THG, for optical heterogeneity) excited at a long-wavelength (LW) band of 1000 nm, and can thus be termed as LW-SHG&THG imaging. These two platforms complement each other synergistically, but were problematic for efficient integration to simultaneously collect SHG, THG, and auto-fluorescence signals using one single (single-beam fixed-wavelength band) excitation. The optimal spectral window for excitation and emission should also maximize the signal generation and detection efficiency for each multiphoton channel while ensuring orthogonality between them for spectral separation at detection. The need for THG contrast rules out SW platforms because of the strong UV absorption by tissue and standard optics.

A major challenge with the development of a LW multiphoton platform is the significantly lower absorption cross sections of intrinsic fluorophores at longer excitation wavelengths. For example, a previous study by the inventors showed high-quality 3PAF imaging of NADH with 1140±60 nm excitation, but this was with an undesirable cost of imaging speed (pixel dwelling time ranged from 200 µs to 1 ms). Tu, et al., "Stain-free histopathology by programmable supercontinuum pulses," Nat. Photonics, vol. 10, pp. 435-540 (2016), which is incorporated herein by reference. In order to achieve real-time label-free imaging, signal generation efficiency had to be dramatically improved without risking apparent photodamage and phototoxicity. Prior studies have demonstrated fast 3PAF imaging by low-f long-τ excitation (1 MHz, 509 fs, 1040 nm, 5.9 mW, and 1 µs per pixel). Since nonlinear optical signal (or photodamage) scales with $<I(t)>^n/(f\tau)^{n-1}$ (n is the order of the nonlinear process; n=2 for SHG/2PAF and n=3 for THG/3PAF), it is expected that a combined low-f and short-τ excitation condition, i.e., a large $(f\tau)^{-1}$ (inverse of duty cycle), would enhance the 3PAF signal at a given $<I(t)>$, which should compensate for the decrease of multiphoton generation efficiency caused by the shift from SW to LW excitation. The photodamage at a typical LW excitation (1080-1180 nm, 80 MHz, 100-250 fs, 120 mW, 3.3 µs per pixel) indicates a nonlinear order r between 2 and 3, just as in the case of SW excitation. Thus, by the use of a larger $(f\tau)^{-1}$ coupled with a smaller $<I(t)>$, the third-order nonlinear imaging by 3PAF or THG gains a favorable signal-to-photodamage ratio. Indeed, for a given imaging SNR, a short τ of 100 fs has mitigated the photodamage occurring at 250 fs in THG imaging.

SUMMARY OF THE EMBODIMENTS

The deficiencies of the prior art are overcome by an optical sensing platform and method as disclosed herein that performs simultaneous label-free autofluorescence-multiharmonic (SLAM) microscopy, featuring, for example, fast epi-detection of NADH from 3PAF and flavin adenine dinucleotide (FAD) from 2PAF, combined with noncentrosymmetric structures from SHG and interfacial features from THG. To eliminate the need for sequential excitation, the excitation wavelength is shifted from the typical 740/900 nm band to a single excitation band across, for example, 1080-1140 nm. Various molecular contrast is simultaneously visualized via four spectrally resolved detection channels. To overcome the challenge of weak intrinsic contrast, some embodiments of the invention use near-transform-limited excitation pulses with relatively broad bandwidth (60 nm, 35 fs) at a low pulse repetition rate (10 MHz), thus resulting in a significantly higher peak power compared to standard pulses. The embodiments disclosed herein overcome the limitations of the prior art in conventional live-cell/tissue imaging and multiphoton microscopy by simultaneously and efficiently exciting autofluorescence and multiharmonic processes, and are a major enabling advance in label-free live-cell/tissue sensing.

In accordance with one embodiment of the invention, a method for sensing a biological sample having a plurality of fluorophores and harmonophores (biomolecules that generate SHG and THG), including a red fluorophore and a blue fluorophore, comprises exciting the red fluorophore via absorption of a photon order of n by a single wavelength band of light that has longer wavelengths than a typical wavelength band of light known to excite the red fluorophore would have. The method further comprises exciting the blue fluorophore substantially via absorption of a photon order of n+1 by the single wavelength band of light. The method also comprises simultaneously detecting light emitted by the red fluorophore and the blue fluorophore. For imaging applications beyond sensing, the method further comprises creating an image from the light detected in the plurality of orthogonal colors.

In accordance with other embodiments of the present invention, the red fluorophore has a first fluorescence spectrum and the blue fluorophore has a second fluorescence spectrum, wherein the first fluorescence spectrum and the second fluorescence spectrum overlap substantially. In accordance with yet another embodiment of the invention, the red fluorophore is a flavoprotein (such as FAD) or a flavoprotein-like fluorophore, and the blue fluorophore is NADH or NADPH.

In accordance with a further embodiment of the invention, exciting the blue fluorophore comprises reducing a duty cycle of the single wavelength band of light.

In certain other embodiments of the invention, the plurality of orthogonal colors comprises a color corresponding to the fluorescence signal of the red fluorophore and a color corresponding to the fluorescence signal of the blue fluorophore.

In yet other embodiments of the invention, the plurality of orthogonal colors further comprises at least one additional color detected from a harmonic process such as THG, SHG, or harmonic scattering. In alternative embodiments, the plurality of orthogonal colors further comprises at least one additional color detected from a fluorescence process, such as four-photon excited fluorescence of ultraviolet endogenous fluorophores such as tryptophan, three-photon excited fluorescence of green fluorescent proteins, two-photon excited fluorescence of red and near-infrared dyes, and one-photon excited fluorescence of near-infrared fluorophores.

In accordance with another embodiment of the invention, the red fluorophore is excited via two-photon absorption and the blue fluorophore is excited via three-photon absorption. In accordance with yet another embodiment of the invention, the red fluorophore is excited via three-photon absorption and the blue fluorophore is excited via four-photon absorption.

In certain other embodiments of the invention, the single wavelength band of light is derived from a mode-locked Yb:fiber laser or a Q-switched microchip laser.

In accordance with a further embodiment of the invention, the biological sample comprises a plurality of spatial components. The detecting further comprises detecting light emitted by a first one of the plurality of fluorophores located in a first one of the plurality of spatial components in one of the plurality of orthogonal colors. The detecting also comprises detecting light emitted by a second one of the plurality of fluorophores located in a second one of the plurality of spatial components in the one of the plurality of orthogonal colors.

In yet another embodiment of the invention, the plurality of spatial components includes biological cells and extracellular media.

In accordance with certain other embodiments of the invention, the single wavelength band of light comprises a wavelength of 1110 nanometers. In further embodiments, the single wavelength band of light has a center wavelength of 1110 nanometers and a width of 60 nanometers.

In accordance with other embodiments of the present invention, the light emitted by the red fluorophore is blue-clipped.

In certain other embodiments of the invention, the exciting of the red and blue fluorophores occurs with a duty cycle of less than $10^{-6}$.

In a further sensing (non-imaging) embodiment of the present invention, the biological sample comprises flowing cells in a flow-cytometer. In yet another imaging embodiment of the present invention, the biological samples comprise live cultured cells or in vivo tissue samples.

In another embodiment of the present invention, the method provides reduced phototoxicity for the biological sample compared to successively exciting the red fluorophore and the blue fluorophore for detecting light in each of the plurality of orthogonal colors.

BRIEF DESCRIPTION OF THE DRAWINGS

The foregoing features of embodiments will be more readily understood by reference to the following detailed description, taken with reference to the accompanying drawings, in which:

FIG. 3 shows a table of clipping-assisted dual-fluorophore sensing variants in accordance with embodiments of the present invention;

DETAILED DESCRIPTION OF SPECIFIC EMBODIMENTS

Figure 1:
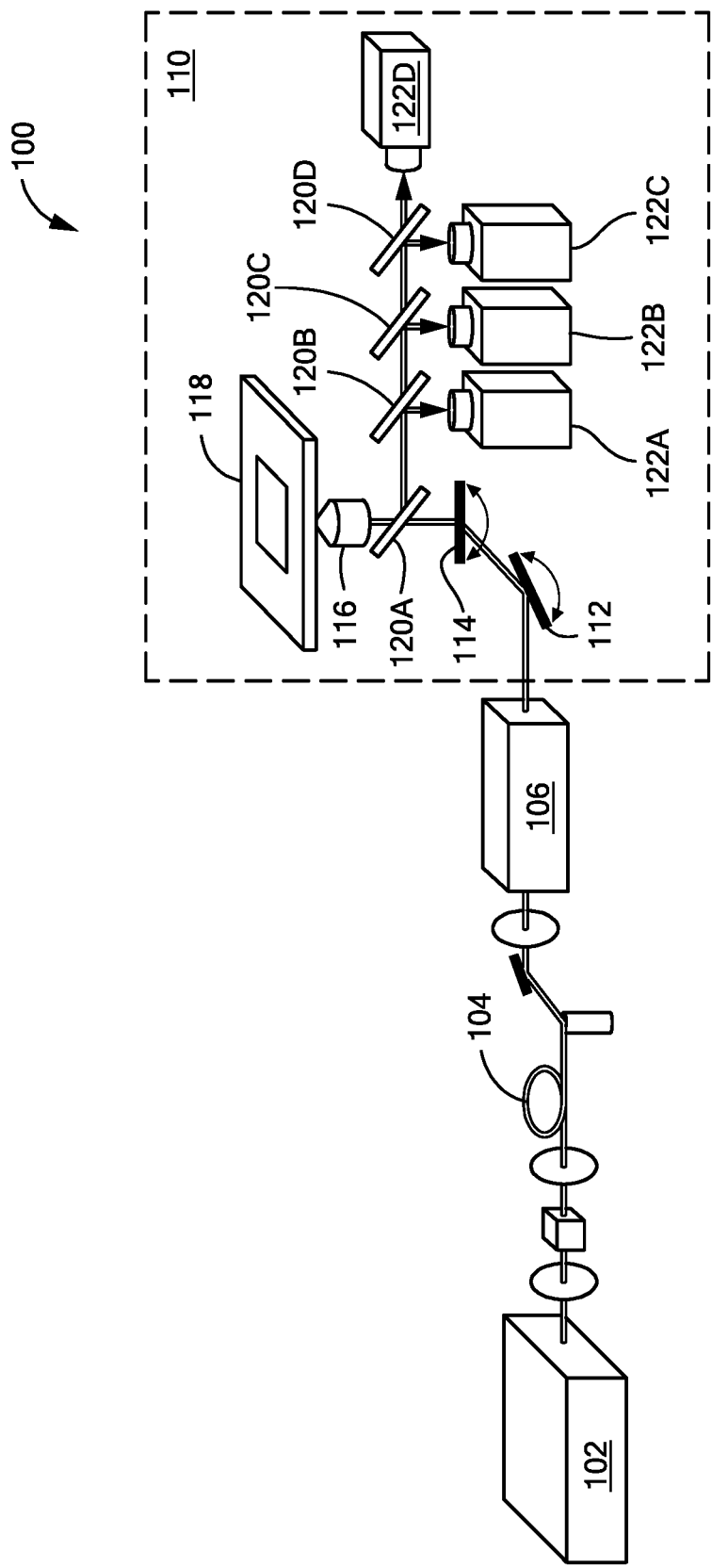
FIG. 1 is an optical schematic diagram of a SLAM microscopy platform in accordance with an embodiment of the present invention.

Definitions. As used in this description and the accompanying claims, the following terms shall have the meanings indicated, unless the context otherwise requires:

An "untagged" molecule is a molecule to which no label or probe has been attached.

A "wavelength band" of light is a term used herein to refer to electromagnetic energy characterized by a spectrum that is simply-connected in frequency space.

The terms "object," "sample," and "specimen" shall refer, interchangeably, to a tangible, non-transitory physical object amenable to being rendered as an image.

The term "biological sample" shall encompass any material associated with an organism that is, or once was, alive, including, without limitation, in vivo samples in humans or animals, biological fluids, flowing biological cells, cell cultures, tissue, tissue cultures, organoid cultures, organoids, liquid surgical waste, blood, etc.

The term "in situ" shall refer to a study of a biological specimen within its biological context.

The term "concurrent" imaging refers to temporal multiplexing of different imaging contrasts in one pixel dwell time, as applied in some hyperspectral imaging techniques.

"Simultaneous" multimodal imaging is here defined as the spectral multiplexing of different detection channels, with no temporal multiplexing, in one pixel dwell time. For imaging with pulsed excitation, it is to be understood that at least one excitation pulse must fall within one pixel dwell time.

A "supercontinuum distribution" of light is sometimes taken as a spectrum of light energy that does not fall by more than 30 dB over a broad range of wavelength; however, the term is used here in a general sense and without specific limitation.

The term "image" shall refer to any multidimensional representation, whether in tangible or otherwise perceptible form, or otherwise, whereby a value of some characteristic (amplitude, phase, etc.) is associated with each of a plurality of locations corresponding to dimensional coordinates of an object in physical space, though not necessarily mapped one-to-one thereon. Thus, for example, the graphic display of the spatial distribution of some field, either scalar or vectorial, such as brightness or color, constitutes an image. So, also, does an array of numbers, such as a 3D holographic dataset, in a computer memory or holographic medium. Similarly, "imaging" refers to the rendering of a stated physical characteristic in terms of one or more images.

The term "modality" shall refer to a specific process for imaging a biological sample using fluorescence microscopy. Examples for modalities may include, but are not limited to, second-harmonic generation (SHG), two-photon autofluorescence (2PAF), third-harmonic generation (THG), and three-photon autofluorescence (3PAF).

The term "orthogonal color" shall refer to a color, i.e. a wavelength band of light, that is spectrally separated from and not overlapping with another color and corresponds to a certain detection channel.

The term "red" shall refer to light with a relatively long wavelength.

The term "blue" shall refer to light with a relatively short wavelength.

The term "red fluorophore" shall refer to a fluorophore emitting at relatively long wavelengths.

The term "blue fluorophore" shall refer to a fluorophore emitting at relatively short wavelengths.

The term "blue-clipped" or "blue clipping" shall refer to a response from a fluorophore where the emission spectrum of the response is clipped at a relatively short wavelength, i.e. wavelengths shorter than the clipping wavelength are not present in the emission spectrum.

The term "duty cycle" or "fτ" shall refer to the fraction of one period in which a signal, e.g. the excitation light beam emitted by a laser, is active. A continuous wave excitation would have a duty cycle of 1.

Laser Scanning Microscope

FIG. 1 depicts an exemplary embodiment of a SLAM microscopy platform 100. The platform shown here is similar to one of the embodiments described in co-pending U.S. patent application Ser. No. 15/928,818, entitled "Molecular Imaging Biomarkers," which is hereby incorporated by reference in its entirety. Laser pulses are emitted by a laser 102. The laser 102 may be an extended cavity industrial laser. The laser 102 may alternatively be a mode-locked Yb:fiber laser or a Q-switched microchip laser. The laser 102 may, for example, generate 350-nJ 1040-nm 314-fs soliton pulses at an average power of 3.5 W. However, the laser 102 may also emit pulses having different energy levels, wavelengths, pulse durations, and average powers. The laser pulses are sent into photonic crystal fiber 104. The photonic crystal fiber 104 generates a supercontinuum from the pulses emitted by the laser 102. The supercontinuum is then sent into pulse shaper 106. The pulse shaper 106 may be a 640-pixel 4-f pulse shaper (BioPhotonic Solutions, Inc., Marlborough, MA) or it may be another suitable pulse shaper. The pulse shaper 106 may be programmed to choose an excitation window and compensate for dispersion to make the output beam near-transform-limited. For example, the pulse shaper may employ amplitude shaping to select only the 1110+/−30 nm band of the supercontinuum. The output power of the selected band is greatly reduced compared to the output power of the laser and may be 50 mW. The output beam of pulse shaper 106 is then sent to a laser scanning microscope 110. Alternative embodiments of the invention may use a pulse compressor instead of the pulse shaper. Since the only purpose of the pulse shaper in the described embodiment is for spectral range selection and pulse compression of the excitation pulses, a more common pulse compressor (e.g., a prism or grating pair) may lead to further cost reduction. Yet other alternative embodiments of the invention may utilize a different laser source instead of the photonic crystal fiber and pulse shaper to achieve similar excitation conditions.

The laser scanning microscope 110 may exemplarily comprise scanning mirrors 112 and 114, an objective 116, and a specimen stage 118. The specimen stage 118 may hold a biological sample containing a plurality of fluorophores and harmonophores of interest. Examples for fluorophores are FAD, other flavoproteins or flavoprotein-like fluorophores, NADH, nicotinamide adenine dinucleotide phosphate (NADPH), tryptophan, genetically encoded calcium indicators such as GCaMP, and dyes such as DRAD5, among others. Examples for harmonophores are collagen (SHG) and lipid (THG). The laser scanning microscope 110 may further comprise dichroic mirrors 120A-D and photomultipliers 122A-D to separate the light emitted by the fluorophores and harmonophores into four spectrally distinct channels. The incoming beam from the pulse shaper 106 is sent through scanning mirrors 112 and 114, dichroic mirror 120A, and objective 116 to the specimen stage 118. The scanning mirrors 112 and 114 may be galvanometer mirrors and allow for raster scanning the incoming light beam. The objective 116 may be a high-UV transmission objective with a relatively low magnification (such as 30×) but a rather high numerical aperture (such as 1.15). This combination of raster scanning and relatively low magnification objective results in a typical field of view of 0.4×0.4 $mm^2$, with an average power of 14 mW incident on a sample on the specimen stage 118 after the loss along the excitation beam path.

Dichroic mirror 120A is used to separate the excitation beam from the light emitted by the fluorophores in the sample on the specimen stage 118. To this end and as an example, dichroic mirror 120A may have a 50%-cut-off edge wavelength (edge) of 750 nm so that light with a wavelength of less than 750 nm is reflected towards the photomultipliers 122A-D. The photomultipliers 122A-D may be photon-counting (or analog) photomultipliers and comprise band-pass filters (not shown) that work together with the dichroic mirrors 120B-D to collect spectrally resolved multimodal multiphoton signals in the photomultipliers. For example, photomultiplier 122A may comprise a filter that allows light with wavelengths between 365 nm and 375 nm to pass. The corresponding dichroic mirror 120B may have an edge of 409 nm, so that light below the edge wavelength is reflected into the photomultiplier 122B. The remaining light is sent to dichroic mirror 120C, which may have an edge of 506 nm. Therefore, light with a wavelength lower than 506 nm is reflected into photomultiplier 122B. The photomultiplier 122B comprises a filter that allows light with wavelengths between 420 nm and 480 nm to pass. The remaining light that passes dichroic mirror 120C is sent to dichroic mirror 120D. Dichroic mirror 120D may have an edge of 570 nm. Light below the edge wavelength is reflected into photomultiplier 122C, while light above the edge wavelength is sent to photomultiplier 122D. Photomultiplier 122C may comprise a bandpass filter that allows light with wavelengths between 540 nm and 570 nm to pass. Photomultiplier 122D may comprise a bandpass filter that allows light with wavelength between 580 nm and 640 nm to pass. It should be noted that the edge wavelengths of dichroic mirrors 120A-D and the bandpass filter wavelengths of photomultipliers 122A-D are exemplary only. Any combination of mirror edge wavelength and bandpass filter wavelength that minimize crosstalk between individual channels and that lead to spectrally resolved, distinct signals generated by the photomultipliers may be chosen by the skilled person.

The four channels detected by the photomultipliers 122A-D may correspond to light generated by the fluorophores and harmonophores in different modalities. For example, the four channels may represent THG, 3PAF, SHG, and 2PAF. However, any other modality or fluorescence process may be imaged through similar photomultiplier arrays detecting light generated by the corresponding molecules. Examples of other modalities and processes are first harmonic scattering, four-photon excited fluorescence of ultraviolet fluorophores (e.g., tryptophan), three-photon excited fluorescence of green fluorescent proteins (e.g., GCaMP-based calcium indicators), two-photon excited fluorescence of red/near-infrared dyes (e.g., DRAD5), and one-photon excited fluorescence of near-infrared fluorophores (i.e., carbon nanotube-based agents).

Single-Shot Two-Fluorophore Sensing

A vast array of cellular and stromal components, including tumor cells, vascular endothelial cells, blood cells, immune cells, and their surrounding extracellular matrix can be simultaneously visualized by SLAM microscopy with high spatiotemporal resolution. A given fluorophore can be sensed via either linear/one-photon (n=1) or nonlinear/multiphoton (n>1) excitation and can be characterized by an n-photon-order excitation spectrum and an emission spectrum independent of n. The linear/one-photon (n=1) excitation spectrum and the emission spectrum can be measured by a commercial spectrofluorometer, while the n-photon-order (n>1) excitation spectrum can be obtained by measuring the multiphoton absorption cross section. An overlap between the long wavelength end of the excitation spectrum and the short wavelength end of the emission spectrum is often observed, reflecting a homogenous broadening of molecular transition in condensed matter physics and a Stokes shift associated with fluorescent emission.

Figure 2:
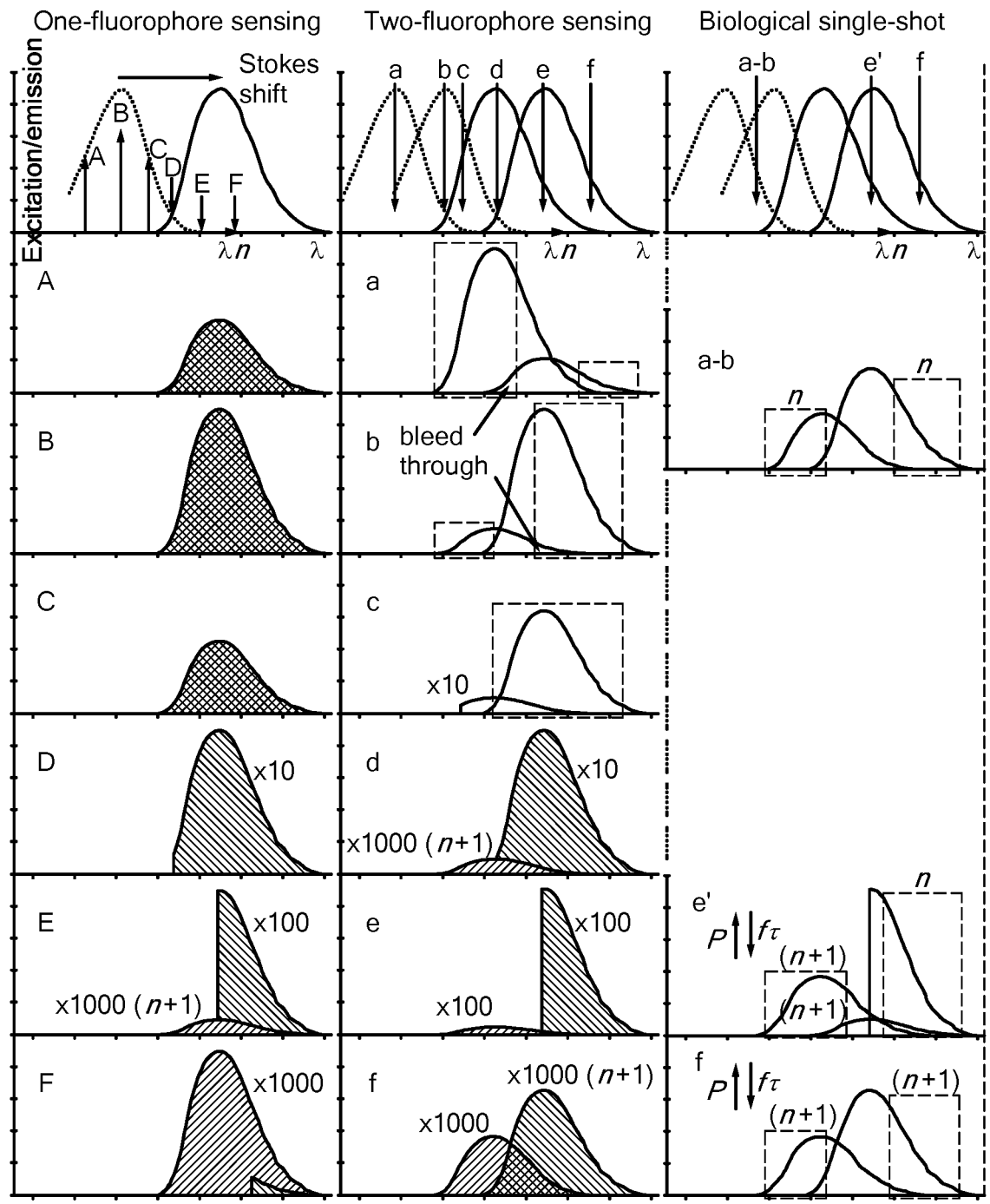
FIG. 2 depicts mixed-photon-order processes and plausible blue-clipped fluorescence in one-fluorophore sensing, general dual-fluorophore sensing, and biological single-shot dual-fluorophore sensing.

FIG. 2 depicts mixed-photon-order processes and plausible blue-clipped fluorescence in one-fluorophore sensing (left panel), general dual-fluorophore sensing (middle panel), and biological single-shot dual-fluorophore sensing (right panel). The upper left panel of FIG. 2 visualizes the Stokes shift between the excitation and the emission spectrum. Also visible in the upper left panel of FIG. 2 is the overlap between the long wavelength end of the excitation spectrum and the short wavelength end of the emission spectrum.

To illustrate how a transition from low photon-order (n) excited fluorescence to incrementally higher photon-order (n+1) excited fluorescence can occur, the left panel of FIG. 2(A-F) shows the emission spectrum of a fluorophore with fixed average power P and fixed duty cycle fτ under a constant sensing (excitation and detection) condition, except for a red-shifting excitation wavelength λ. In this way, the detected λ-dependent fluorescence intensity (integrated area over optical frequency range) follows the n-photon-order excitation spectrum (FIG. 2A, B, C) until a point that significant blue-clipping is observed for the emission spectrum (FIG. 2D). The blue-clipping originates from the same principle that governs the Stokes shift, i.e. one emission photon of n-photon-order excited fluorescence has a lower energy that n excitation photons. Further red-shift of λ will increase the blue-clipping and attenuate the n-photon-order excited fluorescence according to the excitation and emission spectra, until the emergence of (n+1)-photon-order excited fluorescence (FIG. 2E).

Even further red-shift will enable the dominance of the (n+1)-photon-order excited fluorescence over its lower photon-order counterpart (FIG. 2F), completing the transition from low photon-order (n) excited fluorescence to incrementally higher photon-order (n+1) excited fluorescence.

The middle panel of FIG. 2 shows the extension of the above one-fluorophore sensing to two-fluorophore sensing with spectrally overlapping excitation and emission spectra. At a short λ, the n-photon-order excited fluorescence of the blue fluorophore is much stronger than that of the red fluorophore, so that a spectral window can be implemented to selectively sense the blue fluorophore with minimum bleed through (FIG. 2*a*). A similarly good condition to selectively sense the red fluorophore can be attained by a proper red-shift in μ, (FIG. 2*b*). An intermediate condition can be attained for balanced detection of both fluorophores with one shot (FIG. 2, *a-b* in the right panel). Further red-shift in λ, will produce an attenuated blue-clipped fluorescence for the blue fluorophore, so that a larger spectral window can be used to selectively sense the red fluorophore (FIG. 2*c*). Along the direction of further red-shift in λ, the transition from low photon-order (n) excited fluorescence to incrementally higher photon-order (n+1) excited fluorescence happens earlier for the blue fluorophore than the red fluorophore (FIG. 2*d, e, f*). This results in an interesting condition that the n-photon-order excited blue-clipped fluorescence of the red fluorophore dominates its counterpart of the blue fluorophore while the (n+1)-photon-order excited full fluorescence of the blue fluorophore dominates its counterpart of the red fluorophore (FIG. 2*e*). Although the one- and two-fluorophore sensing depicted in the left and middle panels of FIG. 2 represent an oversimplified picture for general fluorescence sensing, the qualitative features of FIG. 2 remain valid for highly different excitation and emission spectra.

Because optical sources with higher peak intensity (higher P and/or lower fτ) are often costly, the relatively weak blue-clipped or higher photon-order excited fluorescence signals emitted at longer λ, are rarely increased by elevating the peak intensity. In other words, there is little incentive to use multiphoton excitation in non-biological fluorescence sensing, because the same signal can often be detected by single-photon excitation more efficiently and economically.

However, the situation changes in in vivo fluorescence sensing that favors single-shot two-fluorophore sensing with low phototoxicity and therefore low photodamage risk, because the biological sample is more tolerable to the high peak intensity (high P and/or low fτ) at longer λ. Since n-photon-order excited fluorescence signal scales with $P^n/(f\tau)^{n-1}$, comparable signals can be obtained from n- or (n+1)-photon-order excited (blue-clipped) fluorescence at longer λ (as shown in FIGS. 2, $e'$ and $f'$) and n-photon-order excited fluorescence at shorter λ (as shown in FIGS. 2, $a$ and $b$). In the case of n=1, multiphoton excitation, as depicted in FIGS. $2e'$ and $f'$, often achieves a higher signal-to-photodamage (or signal-to-photobleach) ratio than single-photon excitation, as shown in FIGS. $2a$ and $b$. More importantly, the mixed-photon-order two-fluorophore sensing that invokes the blue-clipped fluorescence of the red fluorophore (depicted in FIG. $2e'$) can detect the signals more efficiently, i.e. reject less signals to avoid bleed through, than the uniform photon-order two-fluorophore sensing of full fluorescence (FIGS. 2, $a$, $b$, and $f$), either in linear (n=1) or nonlinear (n>1) optical regime. This blue-clipped fluorescence has been invoked to limit its bleed through (background contamination) into the intended signal (comparing FIG. $2c$ and FIG. $2b$), but has rarely been pursued as the signal itself due to the common perception of its inefficient signal generation at the red edge of the excitation spectrum (FIG. 2E and e).

Clipping-Assisted Dual-Fluorescence Sensing (CADFS)

One specific case of the mixed-photon order two-fluorophore sensing with blue fluorescence clipping to the red fluorophore, termed as clipping-assisted dual-fluorescence sensing (CADFS), employs mixed two- and three-photon excitation (n=2, as shown in FIG. $2e'$) of FAD and NADH, arguably the two most important auto-fluorophores. An excitation wavelength of, for example, 1110 nm generates a highly blue-clipped FAD fluorescence, so that the otherwise strongly overlapped emission spectra of NADH and FAD become relatively well resolved for orthogonal spectral detection. While SLAM microscopy is disclosed herein as a specific application of dual-fluorophore sensing, CADFS is not limited to SLAM microscopy. The skilled person can implement other variants of this generalized CADFS to detect different pairs of blue and red auto-fluorophores, leading to different imaging conditions with distinct advantages and limitations. For example, it may be appropriate to attribute the blue fluorophore to NADH-like auto-fluorophores, including NADPH and fatty acids, and the red fluorophore to FAD-like auto-fluorophores, including lipofuscin and Flavin mononucleotide. FIG. 3 shows possible exemplary variants of the CADFS technology disclosed herein for imaging applications.

Although the variants of the CADFS technology shown in FIG. 3 can be easily differentiated by their distinct excitation wavelengths, the access to them does not guarantee a high performance. For example, photodamage-free bio-sensing of NADH and FAD via 3PAF (or porphyrin via blue-clipped 2PAF) at an excitation wavelength of about 1200 nm is not possible by the use of a compact Cr:forsterite laser (fτ=$10^{-5}$), but possible by the use of a bulky optical parametric amplifier (fτ<$10^{-6}$). The decreased fτ is necessary to limit the average excitation power P on the biological sample, and therefore the corresponding phototoxicity of the excitation beam and photodamage inflicted on the biological sample. Therefore, all of the CADFS variants depicted in FIG. 3 require a fτ that is at least one order of magnitude lower than that of typical commercial femtosecond lasers. The lack of readily available low-fτ-lasers may have caused the overlook of CADFS in the prior art. In fact, mixed-photon-order two-fluorophore bio-sensing of NADH and Trp have been realized by a regular high-fτ Ti:sapphire laser at <740 nm excitation with no blue-clipping to the NADH fluorescence. Plausibly due to a lack of low-fτ Ti:sapphire lasers, the excitation has not been shifted to 800 nm to obtain a balanced sensing of NADH (blue-clipped 2PAF) and FAD (full 2PAF), as shown in FIGS. $2a$ and $b$, as well as tryptophan (Trp) (full 3PAF, shown in FIG. 3). The blue-clipping to the otherwise strong NADH/2PAF fluorescence (shifting the wavelength to 800 nm) is required to expose the weak FAD/2PAF fluorescence. This is in contrast to the case of 1110 nm excitation where the blue clipping to the otherwise strong FAD/2PAF fluorescence is required to expose the weak NADH/3PAF fluorescence. Without the blue-clipping, the corresponding full fluorescence would obscure a weak but orthogonal (and therefore informative) fluorescence and forbid the balanced sensing of two responsible fluorophores. Also, the red shift in excitation wavelength that accompanies the blue-clipping has enabled simultaneous THG (lipid) and SHG (collagen) epi-detection, defying the common perception that THG imaging is incompatible with fluorescent imaging of NADH and FAD under one common excitation.

The CADFS technology is rather unintuitive because it must intentionally clip a fluorescence signal of interest and, as a result, attenuates this signal that could otherwise be detected with higher (>10-fold) efficiencies. However, this cost is justified by gaining another fluorescence signal that would be obscured by the fluorescence signal without attenuation, enabling a shift from multi-shot to single-shot two-fluorophore sensing.

CADFS is not limited to two-photon processes. The CADFS method disclosed herein lowers the fτ of a non-tunable laser to enable three-photon and four-photon microscopy and balanced detection of two-, three-, and four-photon excited signals. Thus, CADFS attains favorable general or in vivo applicability through the one-shot strategy.

Further, CADFS is not limited to label-free imaging and can empower conventional two-photon fluorescent microscopy to simultaneously detect two fluorophores with highly spectrally-overlapped fluorescence. The two fluorophores may originate from either auto-fluorescence or exogenous labelling, or a combination of the two, offering numerous opportunities to enhance the biological imaging of interest.

Also, CADFS is not limited to imaging and can be used to enhance the non-imaging applications of two-photon excitation, such as in vivo flow cytometry where the sensing occurs in an animal (or potentially human) body and in vitro flow cytometry when viable cells must be harvested after cell sorting.

Laser Source

The CADFS technology disclosed herein shows that high flexibility in laser source (e.g., a tunable wavelength) is not necessary for multiphoton imaging/sensing with favorable general applicability. Instead of a highly flexible laser, an optimal laser for CADFS would be a laser designed to emit constant-duty-cycle fixed-wavelength pulses at pre-identified optimal conditions that target specific biomolecules, preferably in a compact fiber laser platform suitable for robust portable application. Currently available lasers suited for CADFS are mode-locked Yb:fiber lasers and Q-switched microchip lasers. New laser source engineering will allow a wide use of the CADFS technology outside of a small number of optical laboratories or biological laboratories with engineering expertise. The resulting CADFS imaging systems could then be operated by biologists rather than by laser experts.

For a fixed short-wavelength (<=900 nm) excitation, there have been reports of single-shot multicolor characterization of biological cells. For example, dual-color cell imaging of tryptophan (two-photon) and NADH (two-photon) at 750 nm excitation has been performed, but is limited by photo-toxicity of the 750 nm excitation. Dual-color imaging of NADH (two-photon) and FAD (two-photon) has been performed, but is critically limited by the inability to spectroscopically separate NADH and FAD signals. Third-harmonic generation microscopy of biological cells using 810 nm excitation has been demonstrated, but the generated signal lies in the ultraviolet region and therefore introduces transmission loss in typical optical instrumentation.

It is thus rather unexpected that the CADFS system and method disclosed herein overcomes all these limitation of short-wavelength excitations by shifting the excitation wavelength beyond 900 nm. This shift is nontrivial, because it must be accompanied by laser source engineering of excitation pulses (repetition rate, pulse duration, incident average power, etc.) to ensure balanced generation of multicolor signals. Optimal conditions exist for simultaneous characterization of nonlinear optical heterogeneity (through THG), NAD(P)H, and FAD by one fixed-wavelength excitation within a narrow window of 1000-1200 nm, which is available from compact and reliable lasers such as mode-locked Yb:fiber lasers and Q-switched microchip lasers.

This balanced multicolor imaging and cell phenotyping disclosed herein is beyond the multiphoton microscopy using commercial or conventional lasers or widely-tunable optical parametric oscillators (OPO), all of which operate at a pulse repetition rate f of about 80 MHz and pulse width $\tau$ of about 150 fs, or a duty cycle $f\tau$ of about $10^{-5}$. These parameters constitute the most accessible condition from solid-state femtosecond lasers, but are not necessarily optimal for in vivo imaging. Because multiphoton-excited signals scale with $P^n/(f\tau)^{n-1}$ (n is the order of the nonlinear process; n=2 for SHG/2PAF and n=3 for THG/3PAF), usable 3PAF/THG signals would require P>140 mW if the OPO is tuned to a desired excitation wavelength, such as 1110 nm, which could cause photodamage to the biological sample. Lowering P to a safe level would not only slow down the imaging speed, but also produce attenuated 3PAF/THG signals that may be obscured by less attenuated 2PAF/SHG signals according to the $P^n/(f\tau)^{n-1}$ dependence. Alternatively, without lowering the duty cycle, the orthogonal molecular contrasts of, for example, NADH, lipid, and collagen, may be sequentially obtained using multiple shots (excitation wavelengths) by tuning the OPO or combining two conventional lasers. However, this would eliminate the advantage of single-shot imaging in in vivo applications.

It is therefore clear that laser source engineering targeting desired biomolecules with low-duty cycle 1110 nm pulses, unavailable from commercial or previously reported lasers, is necessary to enable the balanced multicolor imaging and cell phenotyping described above. Thus, SLAM microscopy and CADFS, as disclosed herein, are not simply specific cases of (multi-shot) multimodal multiphoton microscopy that integrate a lot of imaging modalities, and they are not a trivial shift from the multimodal multiphoton microscopy systems and methods known from the prior art.

Application: Tissue Microenvironments

Figure 4:
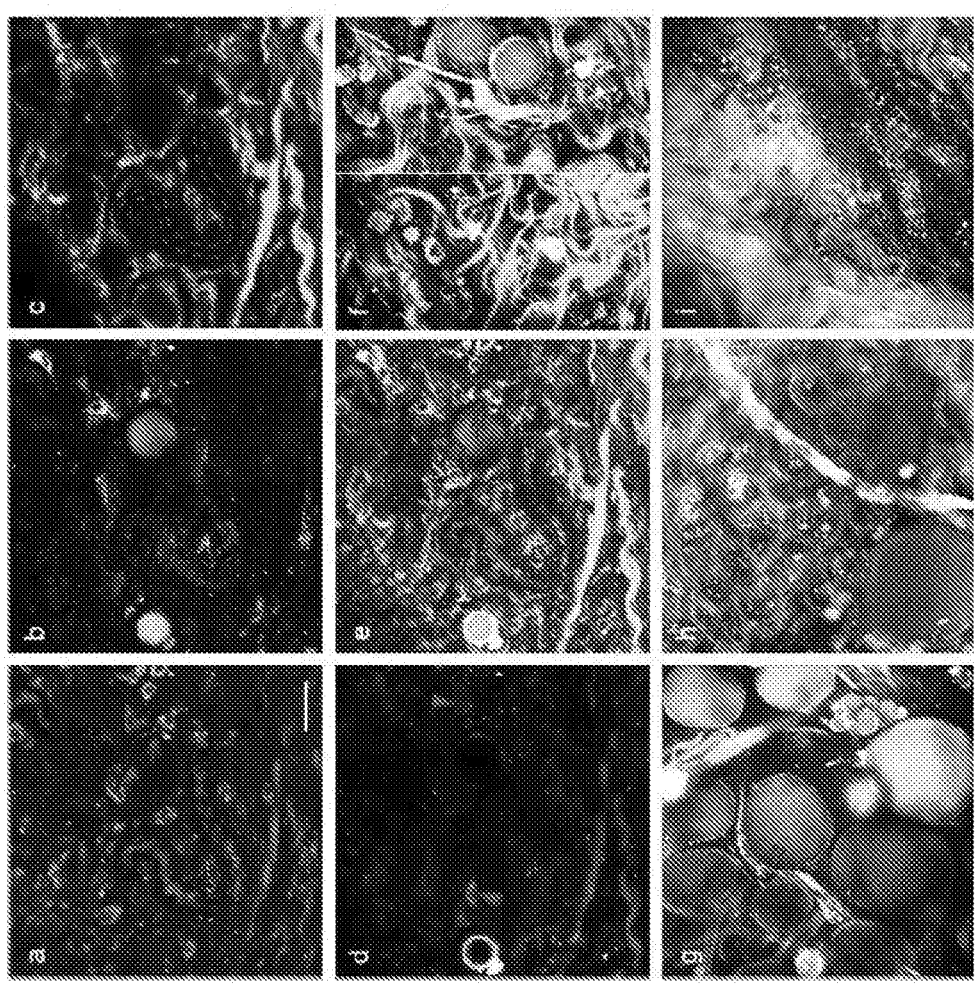
FIG. 4 depicts clipping-assisted dual-fluorophore sensing imaging of a tumor microenvironment.

Exemplary applications of the clipping-assisted dual-fluorophore sensing method disclosed herein are shown in FIG. 4. FIGS. 4a, 4b, 4c, 4d, and 4e depict SLAM/CADFS imaging of a tumor microenvironment of mammary tumor of a living rat. Using an average power of 14 mW at the biological sample surface, images 0.25×0.25 mm² in size were acquired sequentially. The frame rate was 1 Hz, i.e. a 500×500 pixel frame was imaged with a pixel size of about 0.5 μm and a dwell time of about 10 μs, which are comparable to typical NADH/2PAF imaging. FIGS. 4a, 4b, 4c, and 4d show 2PAF (yellow), 3PAF (cyan). SHG (green), and THG (magenta) images of an in vivo rat tumor microenvironment that highlight stromal cells (arrowheads), erythrocytes (broken curves), and an adipocyte (arrow). FIG. 4e is a composite image of FIGS. 4a-d with optically phenotyped cells of different colors (arrowheads).

Some NADH/3PAF-highlighted cells in the unperturbed in vivo tumor microenvironment can be structurally distinguished, i.e. extracted by image segmentation, from lipid vacuoles that also fluoresce in this detection window (FIG. 4b, arrowhead). The complete picture of this tumor microenvironment allows classification of all observed cells into diverse optical phenotypes represented by colors. The phenotypes include cyan-/magenta-/yellow-colored stromal cells of plausible immune origin (FIG. 4e, arrowheads), a yellow-colored adipocyte associated with a cyan-colored lipid vacuole (FIG. 4e, arrow), and yellow-colored erythrocytes flowing in a blood capillary (FIG. 4a, broken curves). Importantly, the yellow color (2PAF) adds to the ternary tissue composition of NADH, collagen, and lipid the fourth orthogonal molecular contrast.

The identification of orthogonally colored cells (FIG. 4e, arrowheads) indicates that neither THG (magenta) nor cellular NADH auto-fluorescence (cyan), imaged separately as in the prior art, can serve as a universal signal to recognize cells in tissue. Simultaneous imaging of more than one fluorophore or harmonophore is needed. The cyan- or yellow-colored cells free of magenta color (THG) may arise from diverse chemical subtypes and/or structures of membrane lipid that do not produce strong THG signals. Thus, the THG contrast that identifies specific cells (FIG. 4d) in tissue contains both functional and structural information of these cells, and therefore parallels the fluorescence contrasts based on NADH/2PAF (cyan) and YRAFs/2PAF (yellow).

FIG. 4f shows mitochondria-like organelles in ex vivo human normal tissue microenvironment (left panel, arrowheads), validated by labeling cell nuclei with acridine orange (right panel, arrowheads). Similar to what is seen in FIG. 4d, subcellular organelles appear in orthogonal colors, and the THG contrast that identifies specific subcellular organelles in tissue therefore contains both functional and structural information.

FIGS. 4g, 4h, and 4i depict capillary vessels in ex vivo human normal tissue (FIGS. 4g and 4h) and tumor (FIG. 4i) microenvironments that reveal different endothelial cells (arrowheads) in freshly dissected mammary tissue. The human endothelial cells shown here are colored similarly to the in vivo rat tumor microenvironment shown in FIGS. 4a-4e. While these specific rat and human cells are chosen to demonstrate the orthogonality among NADH/2PAF, YRAFs/2PAF, and lipid/THG, a wide variety of cell types including epithelial cells in different organs have exhibited a mixture of cyan, yellow, and magenta colors with distinct morphologies, and can be correlated across species between in vivo rat mammary tissue and fresh ex vivo human breast tissue. For biomarker discovery, it is useful to molecularly profile or phenotype different cells in live tissue as well as subcellular organelles (FIG. 4f) and extracellular vesicles that have been released into the stroma, i.e. to perform slide-free virtual histochemistry.

The empowered imaging of various cells by the SLAM/CADFS platform over the prior art also improves the assessment of the extracellular matrix. Various vessels can be structurally and functionally assessed via their structural collagen/SHG and elastin/2PAF indirectly, and via constituent endothelial cells directly (FIGS. 4g-4i). More importantly, the cells of muscle, nerve, and adipose tissue can be first identified by their distinct SHG-visible myosin, THG-visible myelin, and THG-visible lipid vacuoles. Their function can be subsequently profiled using the three colors of cyan, yellow, and magenta. After extensive tests on many types of mouse and human tissue, the accumulated total of spectrally resolved or spatially segmented (orthogonal) cellular and matrix molecular contrasts has surpassed that of detection channels/colors, highlighting the polymorphism of each spectral detection channel and the advantage of image segmentation in multimodal multiphoton microscopy.

Figure 5:
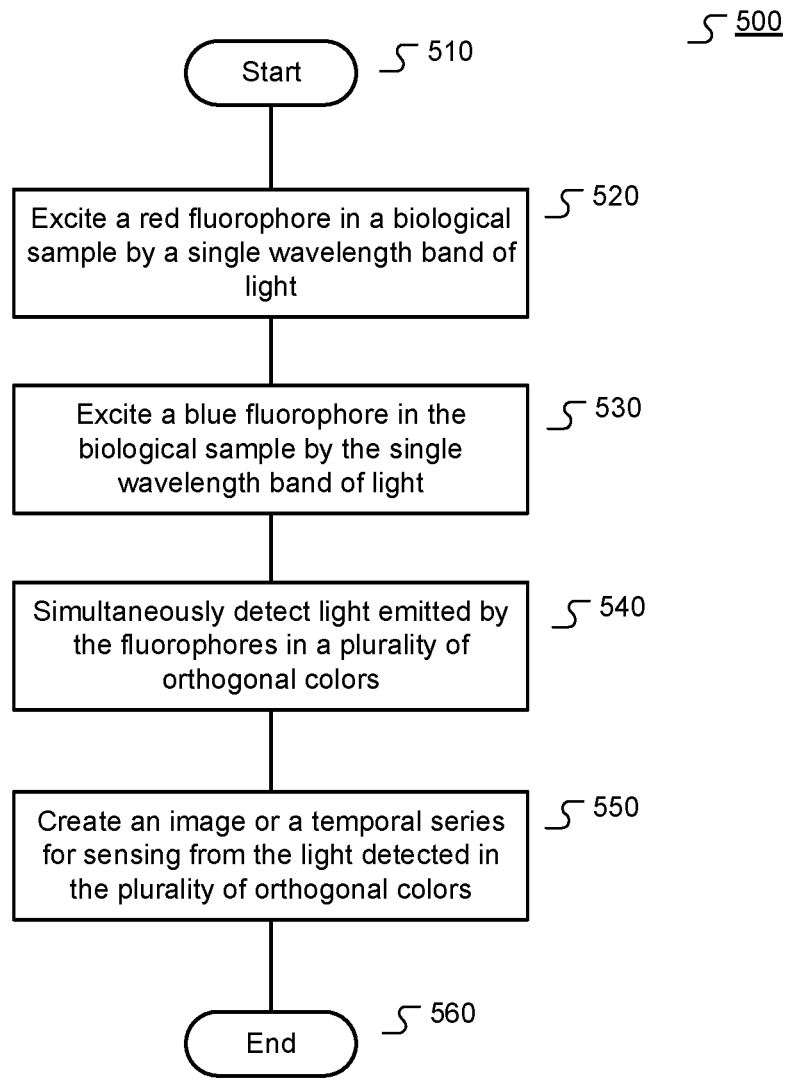
FIG. 5 depicts a method in accordance with an embodiment of the present invention.

FIG. 5 depicts a method 500 in accordance with an embodiment of the present invention. The method begins at step 510. It then proceeds to step 520 where a red fluorophore in a plurality of fluorophores in a biological sample is excited by a single wavelength band of light. The biological sample may be an in vivo sample, such as the one described in reference to FIG. 4, or it may be an in vitro sample, such as cultured cells or flowing cells in a flow-cytometer. The biological sample may comprise a plurality of spatial components. Examples for such spatial components are given above in reference to FIG. 4, such as cells and extracellular media or different cell types.

The single wavelength band of light may be derived from a laser source, such as described above, for example in reference to FIG. 1 and in the section entitled "Laser Source." Thus, the laser source may be a mode-locked Yb:fiber laser or a Q-switched microchip laser. The red fluorophore may, for example, be a flavoprotein such as FAD or it may be a flavoprotein-like fluorophore. The excitation wavelength and duty cycle may be selected in accordance with the principles explained in detail in reference to FIG. 2. For example, the wavelength band of light may be centered on a wavelength of 1110 nm and may be 60 nm wide. The duty cycle of the excitation may be less than $10^{-6}$. The single wavelength band of light may further be chosen to have longer wavelengths than a typical wavelength band of light known to excite the red fluorophore more efficiently. Exciting the red fluorophore with a longer wavelength than the typical wavelength may lead to the light emitted by the red fluorophore being blue-clipped, as described above in detail in reference to FIG. 2.

The red fluorophore may be excited via a photon order of 2, such as via two-photon absorption, as described above in reference to FIG. 2 and FIG. 4. However, it is expressly contemplated that any photon order of n may be used to excite the red fluorophore.

The method then proceeds to step 530 where a blue fluorophore in the plurality of fluorophores in the biological sample is excited by the single wavelength band of light. As described above in reference to FIG. 2, the duty cycle of the light source may be reduced while exciting the blue fluorophore. The blue fluorophore may, for example, be NADH or NADPH, and it may be excited using a photon order of 3, such as via 3PAF. However, it is expressly contemplated that any photon order of n+1 may be used to excite the blue fluorophore.

In step 540, the light emitted by the plurality of fluorophores is detected simultaneously in a plurality of orthogonal colors. Exemplarily, the red fluorophore may have a first fluorescence spectrum and the blue fluorophore may have a second fluorescence spectrum. The first fluorescence spectrum and the second fluorescence spectrum may overlap substantially, such that it would be impossible to detect both spectra simultaneously in the prior art. However, the advantageous selection of excitation wavelength and duty cycle, as described in detail above in reference to FIG. 2, blue-clips the emitted light of the red fluorophore and allows for detecting the light emitted by the red fluorophore and the light emitted by the blue fluorophore in a plurality of orthogonal colors, i.e. spectrally separated channels. The plurality of orthogonal colors therefore may comprise a color corresponding to the blue-clipped fluorescence signal of the red fluorophore and a color corresponding to the fluorescence signal of the blue fluorophore. It is, however, expressly contemplated that the fluorescence spectrum of a fluorophore may also be dependent on the spatial component within the biological sample that the fluorophore is located in. Different fluorophores in different spatial components of the biological sample may have similar fluorescence spectra. For example, the emitted light of FAD in a cell may have a similar color to the emitted light of elastin in an extracellular matrix. It is therefore possible to image different fluorophores using the same orthogonal color, i.e. the same detection channel.

The method then proceeds to step 550 where an image (for imaging applications) or a temporal series for sensing (for non-imaging applications such as standard flow cytometry) is created based on the light detected in the plurality of orthogonal colors. As described above in reference to FIG. 1, photomultipliers may not only detect light but also quantify the detected light in the spectrally separated channels. Based on this quantification, the method can image the biological sample. Examples for possible images are given above, for example in reference to FIG. 4. Exemplarily, the imaging can lead to a distinction of perfused vessels from hollow vessels or a distinction of vascular cells from tumor and stroma cells. The imaging may further apply to a biological sample that is not in vivo but in vitro, such as cultured cells in a petri dish or flowing biological cells in a flow-cytometer (imaging cytometry) or bioreactor, as described above in reference to FIG. 2. The method ends at step 560.

Figure 6:
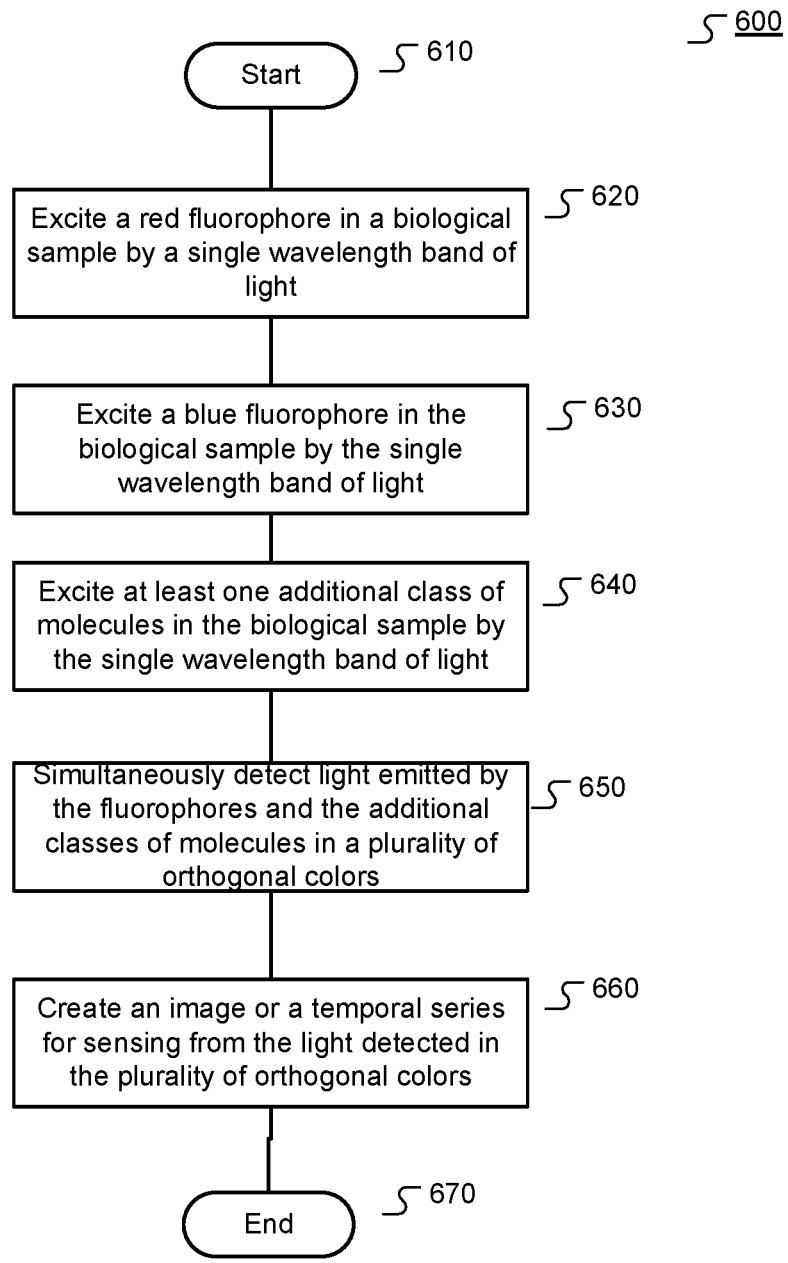
FIG. 6 depicts a method in accordance with another embodiment of the present invention.

FIG. 6 depicts a method 600 in accordance with another embodiment of the present invention. The method begins at step 610. It then proceeds to step 620 where a red fluorophore of a plurality of fluorophores in a biological sample is excited by a single wavelength band of light. The biological sample may be an in vivo sample, such as the one described in reference to FIG. 4, or it may be an in vitro sample, such as cultured cells or flowing cells in a flow-cytometer. The biological sample may comprise a plurality of spatial components. Examples for such spatial components are given above in reference to FIG. 4, such as cells and extracellular media or different cell types.

The single wavelength band of light may be derived from a laser source, such as described above, for example in reference to FIG. 1 and in the section entitled "Laser Source." The laser source may be a mode-locked Yb:fiber laser or a Q-switched microchip laser. The red fluorophore may, for example, be a flavoprotein such as FAD or it may be a flavoprotein-like fluorophore. The excitation wavelength and duty cycle may be selected in accordance with the principles explained in detail in reference to FIG. 2. For example, the wavelength band of light may be centered on a wavelength of 1110 nm and may be 60 nm wide. The duty cycle of the excitation may be less than $10^{-6}$. The single wavelength band of light may further be chosen to have longer wavelengths than a typical wavelength band of light known to excite the red fluorophore more efficiently. Exciting the red fluorophore with a longer wavelength than the typical wavelength may lead to the light emitted by the red fluorophore being blue-clipped, as described above in detail in reference to FIG. 2.

The red fluorophore may be excited via a photon order of 2, such as via two-photon absorption, as described above in reference to FIG. 2 and FIG. 4. However, it is expressly contemplated that any photon order of n may be used to excite the red fluorophore.

The method then proceeds to step 630 where a blue fluorophore of the plurality of fluorophores in the biological sample is excited by the single wavelength band of light. As described above in reference to FIG. 2, the duty cycle of the light source may be reduced while exciting the blue fluorophore. The blue fluorophore may, for example, be NADH or NADPH, and it may be excited using a photon order of 3, such as via 3PAF. However, it is expressly contemplated that any photon order of n+1 may be used to excite the blue fluorophore The method then proceeds to step 640 where at least one additional class of molecules in the biological sample is excited by the single wavelength band of light. As described above in reference to FIG. 1, the additional excitation may be performed via a harmonic process such as THG, SHG, or first harmonic scattering. The additional excitation may also refer to a different fluorescent process such as four-photon excited fluorescence of ultraviolet fluorophores (e.g., tryptophan), three-photon excited fluorescence of green fluorescent proteins (e.g., GCaMP-based calcium indicators), two-photon excited fluorescence of red/near-infrared dyes (e.g., DRAD5), and one-photon excited fluorescence of near-infrared fluorophores (i.e., carbon nanotube-based agents). It is expressly contemplated that any other harmonic or fluorescent process may be used for the additional excitation.

In step 650, the light emitted by the plurality of fluorophores is detected simultaneously in a plurality of orthogonal colors. Exemplarily, the red fluorophore may have a first fluorescence spectrum and the blue fluorophore may have a second fluorescence spectrum. The first fluorescence spectrum and the second fluorescence spectrum may overlap substantially, such that it would be unideal to detect both spectra simultaneously in the prior art. However, the advantageous selection of excitation wavelength and duty cycle, as described in detail above in reference to FIG. 2, blue-clips the emitted light of the red fluorophore and allows for detecting the light emitted by the red fluorophore and the light emitted by the blue fluorophore in a plurality of orthogonal colors, i.e. spectrally separated channels. The plurality of orthogonal colors therefore may comprise a color corresponding to the blue-clipped fluorescence signal of the red fluorophore and a color corresponding to the fluorescence signal of the blue fluorophore. The plurality of orthogonal colors may further comprise at least one additional color corresponding to the excitation of the additional class of molecules. The additional color may be orthogonal to each other and to the color of the blue-clipped red fluorophore and the color of the blue fluorophore to allow for detection and quantification in a spectrally separated channel.

The method then proceeds to step 660 where an image (for imaging applications) or a temporal series for sensing (for non-imaging applications such as standard flow cytometry) is created from the light detected in the plurality of orthogonal colors. As described above in reference to FIG. 1, photomultipliers may not only detect light but also quantify the detected light in the spectrally separated channels. Based on this quantification, the method can image the biological sample. Exemplarily, the imaging may be from the amount of light emitted by the red fluorophore, the amount of light emitted by the blue fluorophore, and the amount of light emitted by the additional classes of molecules. The method ends at step 670.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for characterizing a biological sample having a plurality of fluorophores, including a red fluorophore and a blue fluorophore, the method comprising:
    exciting the red fluorophore via absorption of a photon order of n by a single wavelength band of light having wavelengths sufficiently long to cause the light emitted by the red fluorophore to be blue-clipped;
    exciting the blue fluorophore substantially via absorption of a photon order of n+1 by the single wavelength band of light;
    simultaneously detecting light emitted by the plurality of fluorophores in a plurality of orthogonal colors, wherein the plurality of orthogonal colors includes a first color spectrum corresponding to a blue-clipped fluorescence light emitted from the red fluorophore and a second color spectrum corresponding to a fluorescence light emitted from the blue fluorophore; and
    creating an image or a temporal series for sensing from the light detected in the plurality of orthogonal colors.

2. The method of claim 1, wherein the red fluorophore has a first fluorescence spectrum and the blue fluorophore has a second fluorescence spectrum and wherein the first fluorescence spectrum and the second fluorescence spectrum overlap substantially.

3. The method of claim 2, wherein the red fluorophore is a flavoprotein or a flavoprotein-like fluorophore and wherein the blue fluorophore is NADH or NADPH.

4. The method of claim 1, wherein exciting the blue fluorophore comprises reducing a duty cycle of the single wavelength band of light.

5. The method of claim 1, wherein the plurality of orthogonal colors further comprises at least one additional color detected from a harmonic process.

6. The method of claim 5, wherein the harmonic process is selected from the group consisting of THG, SHG, and first harmonic scattering.

7. The method of claim 1, wherein the plurality of orthogonal colors further comprises at least one additional color detected from a fluorescence process.

8. The method of claim 7, wherein the fluorescence process is selected from the group consisting of four-photon excited fluorescence of ultraviolet fluorophores, three-photon excited fluorescence of green fluorescent proteins, two-photon excited fluorescence of red and near-infrared dyes, and one-photon excited fluorescence of near-infrared fluorophores.

9. The method of claim 1, wherein the red fluorophore is excited via two-photon absorption and wherein the blue fluorophore is excited via three-photon absorption.

10. The method of claim 1, wherein the red fluorophore is excited via three-photon absorption and wherein the blue fluorophore is excited via four-photon absorption.

11. The method of claim 1, wherein the single wavelength band of light is derived from a mode-locked Yb:fiber laser or a Q-switched microchip laser.

12. The method of claim 1, wherein the biological sample comprises a plurality of spatial components and wherein the detecting further comprises detecting light emitted by a first one of the plurality of fluorophores located in a first one of the plurality of spatial components in one of the plurality of orthogonal colors, and detecting light emitted by a second one of the plurality of fluorophores located in a second one of the plurality of spatial components in the one of the plurality of orthogonal colors.

13. The method of claim 12, wherein the plurality of spatial components includes biological cells and extracellular media.

14. The method of claim 1, wherein the single wavelength band of light comprises a wavelength of 1110 nanometers.

15. The method of claim 14, wherein a center wavelength of the single wavelength band of light is 1110 nanometers and wherein a width of the single wavelength band of light is 60 nanometers.

16. The method of claim 1, wherein the exciting occurs with a duty cycle of less than $10^{-6}$.

17. The method of claim 1, wherein the biological sample comprises flowing cells in a flow-cytometer.

18. The method of claim 1, wherein the biological sample comprises live cultured cells or in vivo tissue.

19. The method of claim 1, wherein the method provides reduced phototoxicity for the biological sample compared to successively exciting the red fluorophore and the blue fluorophore for detecting light in each of the plurality of orthogonal colors.

20. A method for characterizing a biological sample having a plurality of fluorophores, including a red fluorophore and a blue fluorophore, the method comprising:
 exciting the red fluorophore via absorption of a photon order of 2 by a single wavelength band of light having wavelengths sufficiently long to cause the light emitted by the red fluorophore to be blue-clipped;
 exciting the blue fluorophore substantially via absorption of a photon order of 3 by the single wavelength band of light;
 exciting an ultraviolet fluorophore substantially via absorption of a photon order of 4 by the single wavelength band of light;
 simultaneously detecting light emitted by the plurality of fluorophores in a plurality of orthogonal colors; and
 creating an image or a temporal series for sensing from the light detected in the plurality of orthogonal colors.

* * * * *